(No Model.)

G. H. BURKE.

HANDLE FOR GLASS VESSELS, &c.

No. 250,708. Patented Dec. 13, 1881.

WITNESSES

E. B. Bolton

Geo. Bainston

INVENTOR:

George H. Burke.

By his Attorneys,

Burke, Fraser & Cornett

UNITED STATES PATENT OFFICE.

GEORGE H. BURKE, OF NEW YORK, N. Y.

HANDLE FOR GLASS VESSELS, &c.

SPECIFICATION forming part of Letters Patent No. 250,708, dated December 13, 1881.

Application filed October 22, 1881. (No model.)

*To all whom it may concern:*

Be it known that I, GEORGE H. BURKE, a citizen of the United States, residing in the city, county, and State of New York, have invented certain Improvements in Handles for Vessels of Glass and Ceramic Materials, of which the following is a specification.

My invention relates to removable handles for vessels of glass, porcelain, and similar fragile materials, the essential characteristics of the invention being the looseness of the attaching-band, whereby the vessel may contract and expand without breaking, and the readiness with which the handle may be removed, should the vessel be accidentally broken, and applied to another vessel.

The novel features of the invention will be set forth definitely in the claims.

Figure 1:
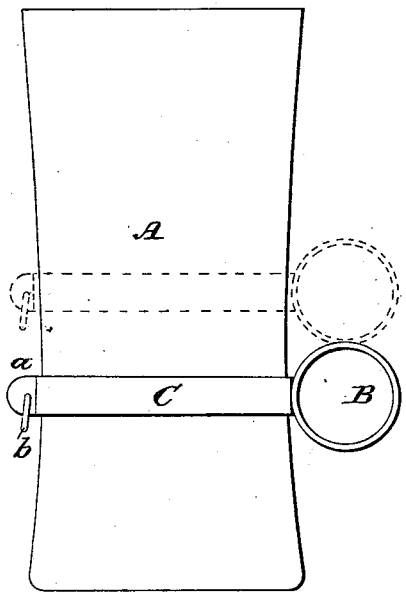
Figure 2:
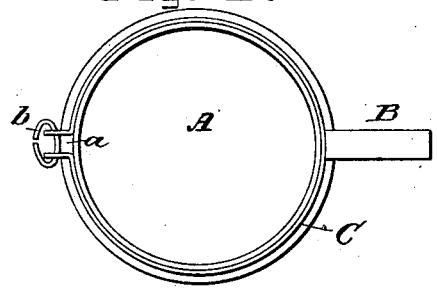
Figure 3:
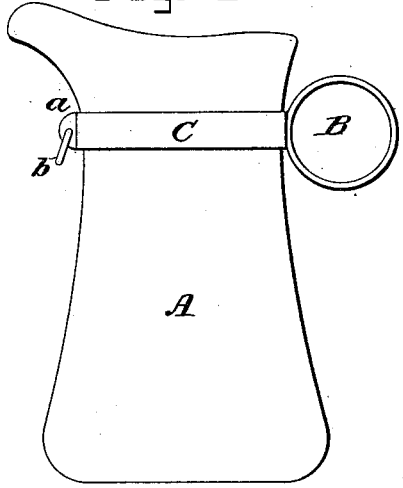
Figure 5:
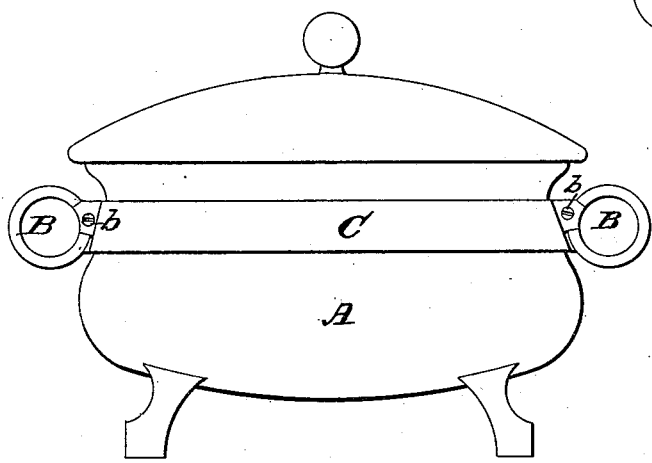

In the drawings which serve to illustrate my invention, Figure 1 is a side elevation of glass vessel for hot drinks provided with my improvement, and Fig. 2 is a plan of the same. Fig. 3 is a side elevation of a pitcher similarly provided. Fig, 4 is a side elevation of a mug similarly provided. Fig. 5 is a side elevation of a covered bowl similarly provided.

Referring to Figs. 1 and 2, A is a thin glass vessel, slightly contracted at the middle, so as to present at this point a less diameter than at the top and bottom. Such vessels are well known as "hot-whisky" glasses.

B is the handle, which is fixed to a band, C, of metal or other suitable material. This band is open at *a*, and its two flanged ends are perforated to receive an open coupling-ring, *b*.

Where the vessel is to be used for hot fluids the band C is made to fit loosely on the same, so as to permit of expansion and contraction of the glass without breaking.

The band is attached to the vessel by being sprung open and slipped over the top, after which the ring *b* is inserted. The dotted lines in Fig. 1 show how the band may slip up and down upon the vessel. Should the vessel, which is very fragile, be accidentally broken, it is not necessary to furnish a new handle, as the handle from the broken vessel may be readily attached to the new one.

In Fig. 3 I have shown the handle attached to a pitcher in precisely the same manner as that last described.

Figure 4:
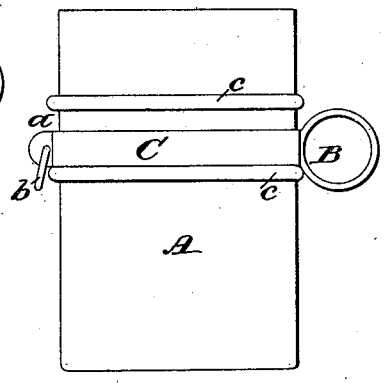

In Fig. 4 I have shown the handle affixed to a cylindrical mug or vessel, two beads, *c c*, being formed on the body of the vessel to prevent the escape of the band.

In Fig. 5 I have shown a modification of the construction. In this case the band is formed in two parts, which are secured together by screws after being put in place on the vessel. Two handles are also shown. This construction is only needed where two handles are employed.

The bands and handles may be highly ornamented, if desired, and, being of metal, will outlast many vessels of glass or other fragile material.

Where bands are rigidly and non-removably fixed on vessels of this character they are usually soldered after being arranged in their places. The heat of soldering frequently breaks the vessel, and if it escapes this danger any hot liquid put into the vessel is apt to expand it within the tight non-yielding band and fracture it. The band and handle cannot be applied by the user to new vessels.

The band which encircles the vessel might be made from elastic material, as spring-brass, and its elasticity be relied upon to keep it in place without means for securing its free ends; but I prefer using the open ring *b*, as being more secure and reliable.

I am fully aware that bottles have been provided with open sheet-metal bands around their necks, secured by twisted wires, said bands serving as hinging-points or bases for the wire bails of bottle-stoppers; and I make no claim to this. These have no analogy to handles for vessels, and such bottles are not provided with handles.

My invention contemplates the attachment of handles to vessels, and not to hinging on the covers thereto.

Having thus described my invention, I claim—

1. A removable handle for vessels of glass and similar fragile materials, comprising an open ring arranged to encircle the vessel, and capable of being readily placed thereon and removed therefrom at will, and a handle proper affixed to said band, substantially as and for the purposes set forth.

2 A removable handle for vessels of glass and similar fragile materials, comprising a handle proper affixed to an open band adapted to encircle the body of the vessel, and provided with a ready means for securing the ends of the band, substantially as and for the purposes set forth.

3. The combination, with a vessel of glass or similar fragile material, having its body reduced in diameter between its top and bottom to receive the band, of a band arranged to fit loosely around the body of the vessel and a handle affixed to said band, substantially as and for the purposes set forth.

4. The combination, with a vessel, A, of the loose detachable band C and the handle B, affixed to said band, all constructed and arranged substantially as set forth.

5. The combination of the handle B, the open band C, provided with perforated flanges at its adjacent ends, and the open coupling-ring $b$, all constructed and arranged substantially as set forth.

In witness whereof I have hereunto signed my name in the presence of two subscribing witnesses.

GEORGE H. BURKE.

Witnesses:
FREDERICK HAVILAND,
F. P. ABBOT.